(12) United States Patent
Yamamoto et al.

(10) Patent No.: US 6,420,060 B1
(45) Date of Patent: Jul. 16, 2002

(54) SOLID POLYMER ELECTROLYTE FUEL CELL COGENERATION SYSTEM

(75) Inventors: Yoshiaki Yamamoto, Katano; Masataka Ozeki, Izumi; Akinari Nakamura, Kadoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/572,166

(22) Filed: May 17, 2000

(30) Foreign Application Priority Data

May 25, 1999 (JP) .......................................... 11-145551

(51) Int. Cl.[7] ................................................ H01M 8/04
(52) U.S. Cl. ............................. 429/24; 429/17; 429/19; 429/20; 429/21; 429/22; 429/26; 429/30; 429/12
(58) Field of Search .......................... 429/12, 17, 20, 429/19, 21, 22, 24, 26, 30

(56) References Cited

U.S. PATENT DOCUMENTS 5,985,474 A * 11/1999 Chen et al. ................... 429/17
6,186,254 B1 * 2/2001 Mufford et al. ............ 180/65.3

FOREIGN PATENT DOCUMENTS

| JP | 05121082 A | 5/1993 |
| JP | 10172598 A | 6/1998 |

* cited by examiner

Primary Examiner—Patrick Ryan
Assistant Examiner—Angela J. Martin
(74) Attorney, Agent, or Firm—Akin, Gump, Strauss, Hauer & Feld, L.L.P.

(57) ABSTRACT

The present invention provides a fuel cell cogeneration system which can stably supply hot water at high temperature shortly after the system starts to operate. The cogeneration system comprises a solid polymer electrolyte fuel cell system for generating electric power and heat by reacting fuel gas with an oxidant gas, a cooling water circulating path for circulating cooling water for recovering heat generated by the fuel cell system, a storage tank for reserving hot water to be supplied to an external hot-water supply load, a heat exchanger for transferring heat recovered by the cooling water to water in the storage tank, and a heating path connected to the storage tank in order to pass water in the storage tank through the heat exchanger, the heating path having the heat exchanger, wherein a water inlet of the heating path and a water filling port for supplying water to the storage tank from the outside of the system are formed both at a lower part of the storage tank, and wherein a water outlet of the heating path and a hot-water supply port for supplying hot water in the storage tank to the external hot-water supply load are provided both at an upper part of the storage tank.

8 Claims, 4 Drawing Sheets

SOLID POLYMER ELECTROLYTE FUEL CELL COGENERATION SYSTEM

BACKGROUND OF THE INVENTION

The present invention relates to a fuel cell cogeneration system generating electric power and heat, particularly to a cogeneration system using a solid polymer electrolyte fuel cell.

The solid polymer electrolyte fuel cell generates electric power by reacting fuel gas, such as hydrogen, with oxidant gas, such as oxygen. This reaction also generates heat simultaneously with electric power. The solid polymer electrolyte fuel cell cogeneration system supplies the electric power and heat thus generated to an external load.

FIG. 4 shows a conventional solid polymer electrolyte fuel cell cogeneration system.

A fuel gas generating unit 9, e.g. reformer heats a raw material, such as natural gas, supplied from the outside in a steam atmosphere to generate hydrogen-rich fuel gas. A fuel cell 1 is supplied with fuel gas and oxidant gas such as air which are humidified by respective humidifiers 17 and 18.

Direct current (DC) generated by the fuel cell 1 is converted to alternating current (AC) by an inverter 2 and subsequently supplied to a power load, grid-connected with commercial electric power supply. In other words, when an output from the cogeneration system exceeds the power load, excess power is "sold" to a utility.

The heat generated by the fuel cell 1, on the other hand, is supplied to a hot-water supply load such as hot-water supply or heating, for example.

A cooling pump 6 circulates cooling water to the fuel cell 1 in order to recover the heat generated by the fuel cell 1.

A storage tank 13 stores city water. A three way valve 7 is usually connected between points A and B as shown in the figure when the system is operated, and the, cooling water is cooled by a heat exchanger 3 located at a bottom of the storage tank 13 after passing through the fuel cell 1. As a result, water in the storage tank 13 is heated. Hot water thus obtained is utilized. by the hot-water supply load such as heating. The cooling water which has a low temperature due to heat loss, on the other hand, is recirculated to the fuel cell 1. When water in the storage tank 13 is heated sufficiently, the three way valve 7 is connected at points A and C and the heat of the cooling water passing through the fuel cell 1 is discharged outside the system by a radiator 11.

The conventional fuel cell cogeneration system as shown above primarily heats water at the bottom of the storage tank 13, which generates convection of water in the storage tank 13. This corrects a temperature difference of water in the storage tank 13 but inversely increases time for supplying hot water after the system starts to operate. In order to cope with a large-size hot water supply load, it is necessary to prepare another hot water supplying apparatus for supplemental heating.

BRIEF SUMMARY OF THE INVENTION

The object of the present invention is to provide a solid polymer electrolyte fuel cell cogeneration system which solves the above-mentioned drawbacks of the prior art system and can not only stably supply hot water at high temperature shortly after the system starts to operate but also readily cope with changes in power load and a large hot-water supply load.

The solid polymer electrolyte fuel cell cogeneration system in accordance with the present invention comprises a solid polymer electrolyte fuel cell for generating electric power and heat by reacting fuel gas with oxidant gas; a fuel gas generating unit for generating fuel gas; an inverter for supplying electric power to an external power load by converting DC output from the fuel cell to AC; a cooling water circulating path for circulating cooling water for recovering heat generated by the fuel cell or fuel gas generating unit; a storage tank for reserving hot water to be supplied to an external hot-water supply load; a heat exchanger for transferring heat recovered by the cooling water to water in the storage tank; a heating path connected to the storage tank; and a pump for passing water in the storage tank through the heat exchanger, the heating path having the heat exchanger, wherein a water inlet of the heating path and a water filling port for supplying water to the storage tank from the outside of the system are formed both at a lower part of the storage tank, and wherein a water outlet of the heating path and a hot-water supply port for supplying hot water in the storage tank to the external hot-water supply load are provided both at an upper part of the storage tank.

In a preferred mode of the present invention, the solid polymer electrolyte fuel cell cogeneration system further comprises a heater provided in the heating path for passing water in the storage tank through the heat exchanger and a detector for detecting a magnitude of the external power load.

In another preferred mode of the present invention, the solid polymer electrolyte fuel cell cogeneration system further comprises controlling means. for supplying excess electric power to the heater, based on such a detection signal that a magnitude of the external power load detected by the detector is smaller than output electric power of the fuel cell.

In still another preferred mode of the present invention, the solid polymer electrolyte fuel cell cogeneration system further comprises a thermodetector for detecting a temperature of water in the storage tank. It is also desirable to provide controlling means for supplying output electric power of the fuel cell to the heater when a temperature of water detected by the thermodetector decreases lower than a predetermined value.

In still another preferred mode of the present invention, the solid polymer electrolyte fuel cell cogeneration system further comprises another thermodetector for detecting a temperature of water passing through the heat exchanger and means for controlling the pump in such a way that a temperature of water detected by the thermodetector is kept constant, both being provided further down the heat exchanger in the heating path.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
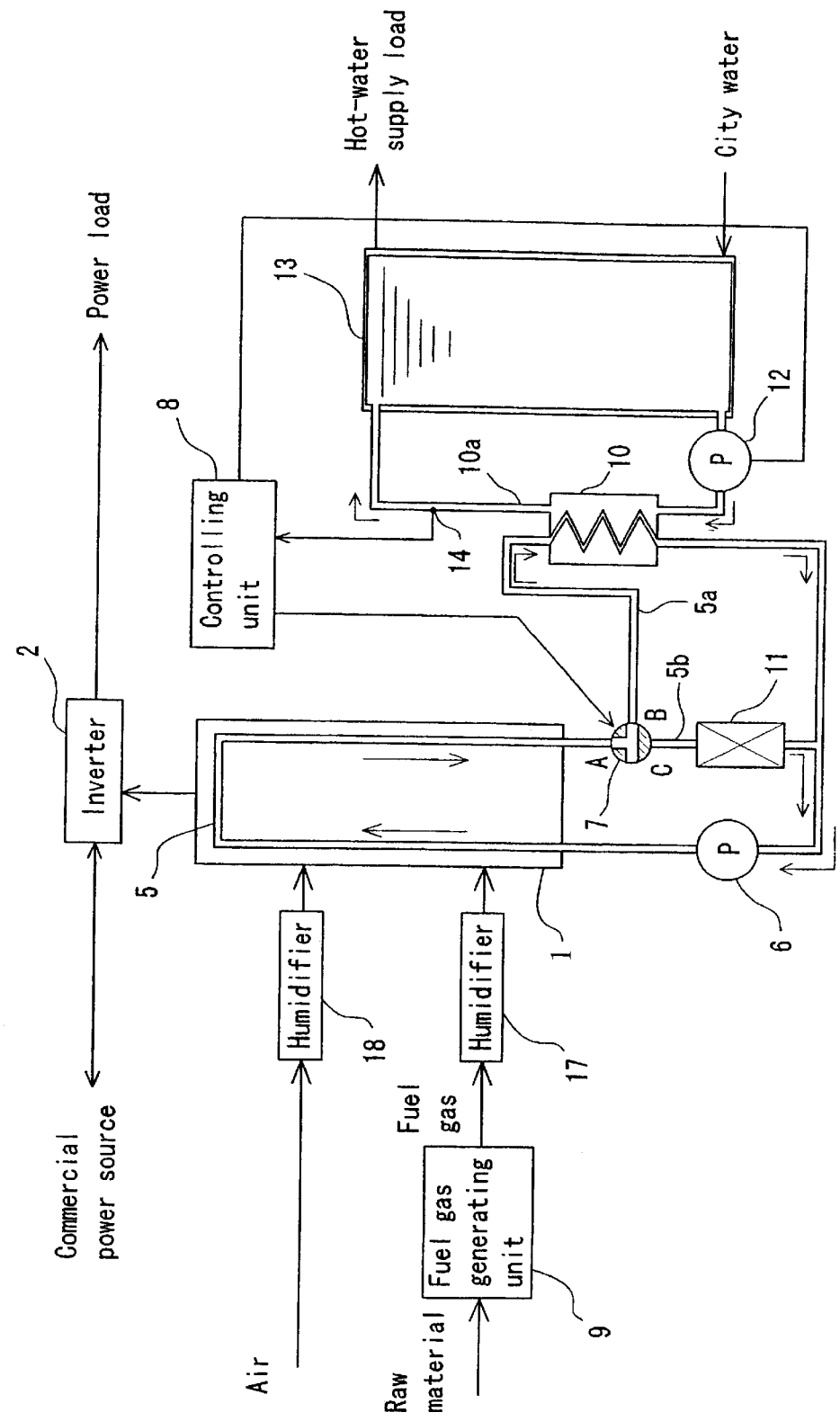
FIG. 1 is a block diagram illustrating a structure of a solid polymer electrolyte fuel cell cogeneration system of one example in accordance with the present invention.

In the following, the present invention will be described more specifically by way of concrete examples, referring to the drawings.

EXAMPLE 1

FIG. 1 shows the structure of a solid polymer electrolyte fuel cell cogeneration system in accordance with Example 1.

A fuel gas generating unit 9, e.g. reformer generates hydrogen-rich fuel gas by heating a raw material supplied from the outside in a steam atmosphere. A fuel cell 1 is provided with fuel gas and oxidant gas such as air which are humidified by respective humidifiers 17 and 18.

The fuel cell 1 generates electric power and heat by reacting the fuel gas containing hydrogen with air. The thus generated DC is converted to AC by an inverter 2 and is subsequently supplied to an external power load, grid-connected with a commercial power source.

The heat generated together with electric power is stored in the form of hot water and is supplied to a, hot-water supply load as shown below.

When operated, the fuel cell 1 is kept at about 80° C. by circulating cooling water in a cooling path 5, provided inside the fuel cell. A cooling pump 6 circulates cooling water in the cooling path 5. A path 5a which passes through a heat exchanger 10 and a path 5b, which passes through a radiator 11 are connected via a three way valve 7 to the cooling path 5. Cooling water normally has a temperature of about 70° C. after passing through the fuel cell 1. At heat supply such as hot-water supply, the three way valve 7 is connected between A and B and cooling water which is heated during its passage through the fuel cell 1 runs toward the path 5a and passes through the heat exchanger 10. The cooling water from which heat is discharged during its passage through the heat exchanger 10 is supplied again to the fuel cell 1 by the cooling pump 6.

A storage tank 13 filled with city water is connected with a heating path 10a for passing water in the storage tank through the heat exchanger 10. Since the heating path 10a connects a low temperature side of the heat exchanger 10 to a lower part of the storage tank 13, water proximal to a bottom of the storage tank 13 is drawn by a water circulating pump 12 and is supplied to the heat exchanger 10. Water which is heated during its passage through the heat exchanger 10 is retained proximal to an upper face of the storage tank 13 by the heating path 10a.

The storage tank 13 is provided with city water from a bottom side of the tank and hot water is supplied to an external hot-water supply load, such as hot-water supplying apparatus and heating, from an upper side of the tank.

A thermistor 14 provided downstream from the heat exchanger 10 detects a temperature of water which is heated during its passage through the heat exchanger 10. A controlling unit 8 controls a water amount to be supplied by the water circulating pump 12 so that the temperature of water detected by the thermistor 14 is kept constant.

When the temperature of water after passing through the heat exchanger 10 is stabilized at a predetermined value, the controlling unit 8 controls the three way valve 7 to connect between A and C in order to circulate cooling water after passage through the fuel cell 1 to a radiator 11 to discharge heat of the cooling water outside the system.

The polymer electrolyte fuel cell normally operates at a temperature of 80° C. or so and cooling water has a temperature of 70° C. or higher. Therefore, the temperature of water which passes through the heat exchanger 10 and returns to the storage tank 13 becomes constant at a temperature of 60° C. or higher. When city water has a temperature of 20° C., for example, the temperature of water is 60° C. at an upper part of the storage tank and 20° C. at a lower part of the tank. Under such temperature condition, thermal gradient of water in the storage tank 13 can be maintained because of smaller water density at the upper part than at the lower part. Therefore, during operation of the fuel cell 1 water in the storage tank 13 forms a layer structure comprising a layer of hot water which is heated during passage through the heat exchanger 10 and a layer of cool water before heating. Consequently, the layer of hot water located at the upper part increases gradually when the system does not supply hot water.

When the system supplies hot water, hot water is supplied from the layer of hot water to a hot-water supply load, enabling constant supply of hot water at high temperature.

As described above, according to Example 1, it is possible to store hot water at constant temperature in the storage tank and stably supply hot water at any time.

In the foregoing example, although heat generated by the fuel cell is utilized for hot-water supply, residual heat remaining in a burner when the raw material is heated at the fuel gas generating unit or combustion heat of the gas exhausted from the fuel cell can be similarly utilized for hot-water supply.

EXAMPLE 2

In the present example, a preferred example of the solid polymer electrolyte fuel cell which can rapidly a cope with any change in power load will be described.

Figure 2:
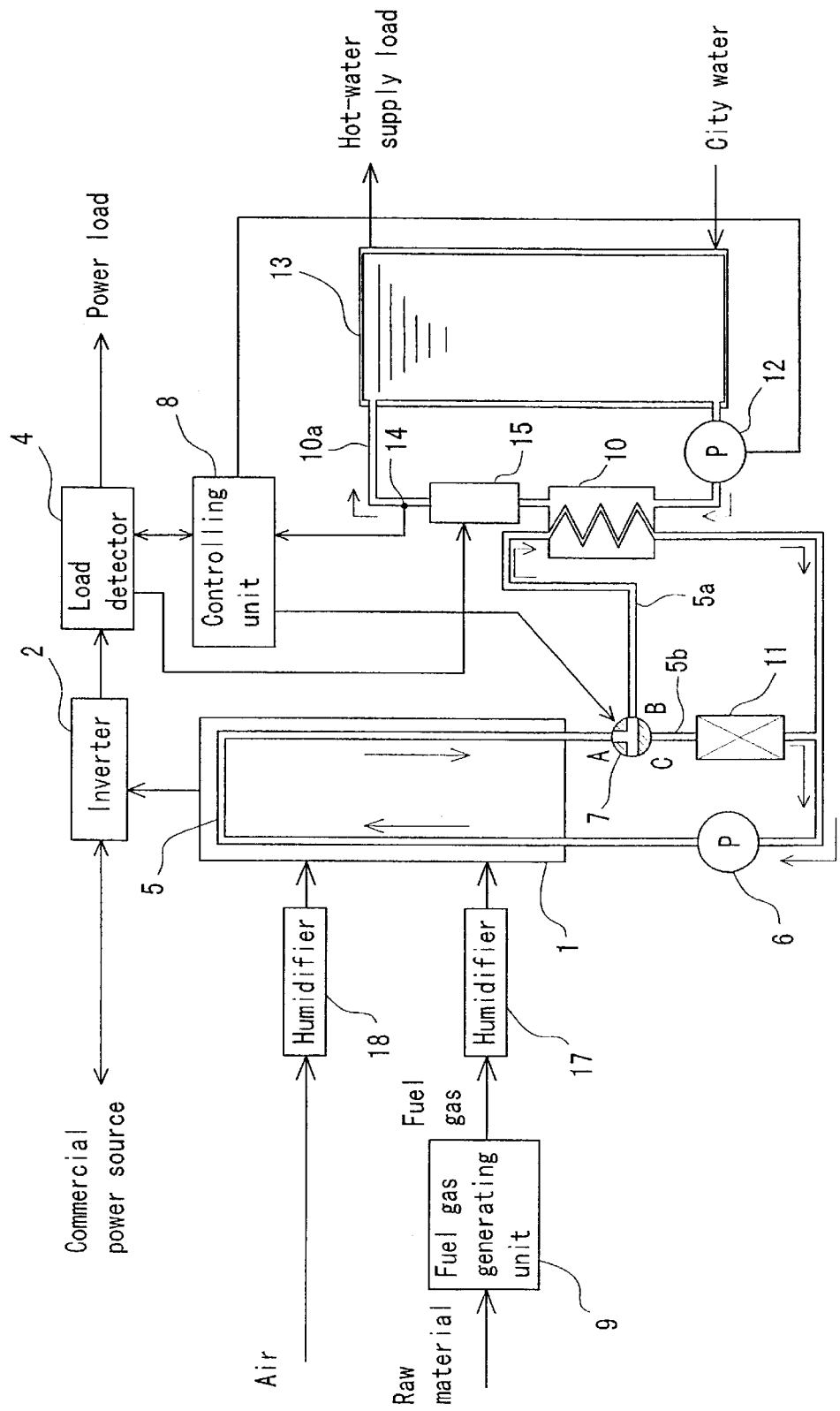
FIG. 2 is a block diagram illustrating a structure of a solid polymer electrolyte fuel cell cogeneration system of another example in accordance with the present invention.

FIG. 2 shows a solid polymer electrolyte fuel cell cogeneration system in accordance with Example 2.

The system comprises a load detector 4 for comparing a magnitude of a power load connected to the system with an output of an inverter 2. The load detector 4 outputs a detected signal to a controlling unit 8. When the output of the inverter 2 exceeds the magnitude of the power load, the controlling unit 8 issues a command signal to the load detector 4 to supply excess electric power to a heater 15. The heater 15 is provided in a heating path 10a downstream from a heat exchanger 10 and supplementarily heats the water heated by the heat exchanger 10. A thermistor 14 detects a temperature of water heated by the heat exchanger 10 and heater 15. The controlling unit 8 controls a water circulating pump 12 so that the temperature of water detected by the thermistor 14 is kept constant.

According to the present example, it is possible to utilize excess electric power effectively thereby improving a hot-water supplying ability of the system. It is also possible to cope with any change in load instantly without causing inverse tidal current.

Alternatively, the output of the heater 15 may be controlled in agreement with the temperature of water detected by the thermistor 14.

Similar to Example 1, the solid polymer electrolyte fuel cell cogeneration system in accordance with Example 2 allows use of residual heat remaining in the burner of the fuel gas generating unit or combustion heat of the gas exhausted from the fuel cell for hot-water supply.

EXAMPLE 3

In the present example, a preferred example of the solid polymer electrolyte fuel cell cogeneration system which can cope with a larger hot-water supply load will be described.

Figure 3:
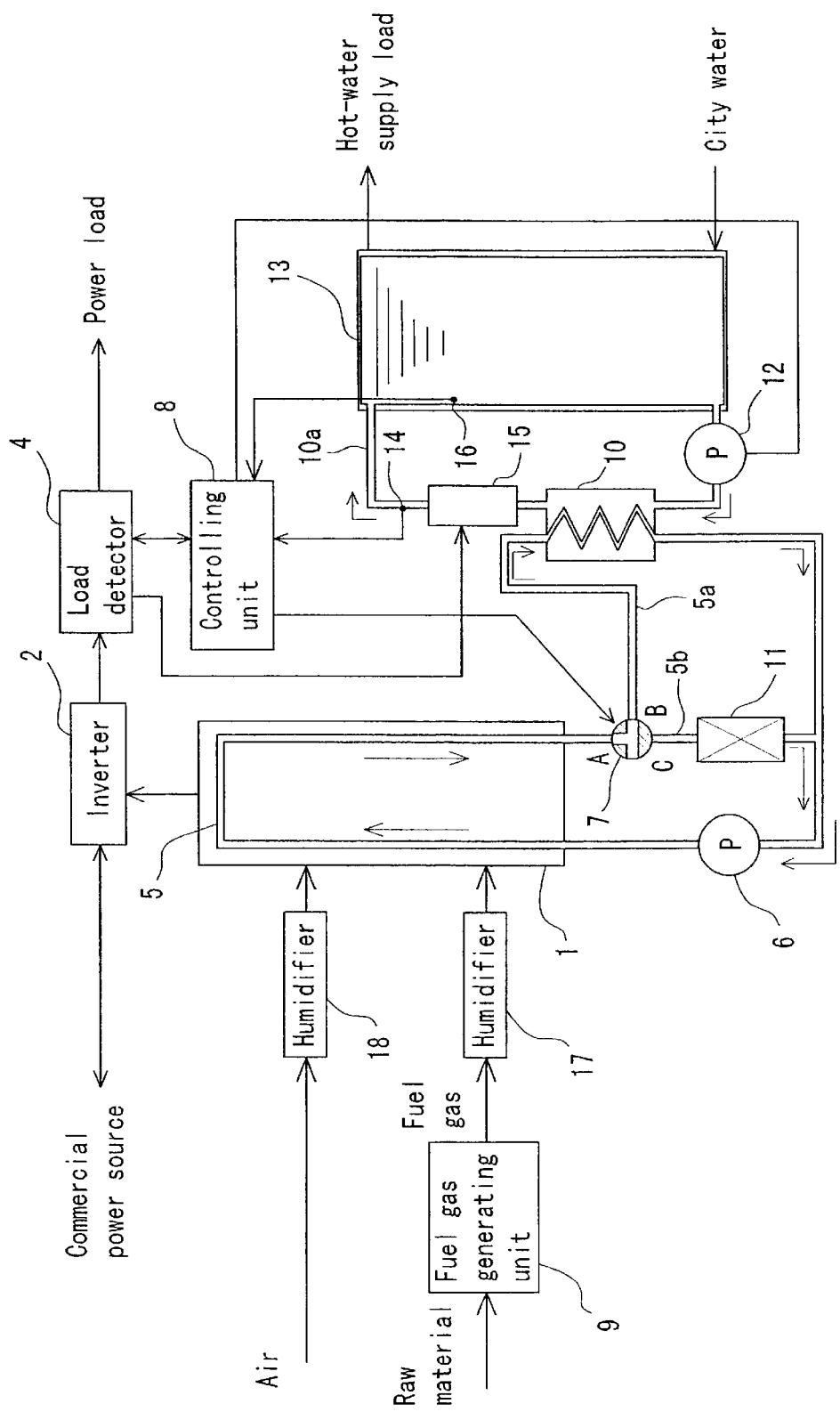
FIG. 3 is a block diagram illustrating a structure of a solid polymer electrolyte fuel cell cogeneration system of still another example in accordance with the present invention.
Figure 4:
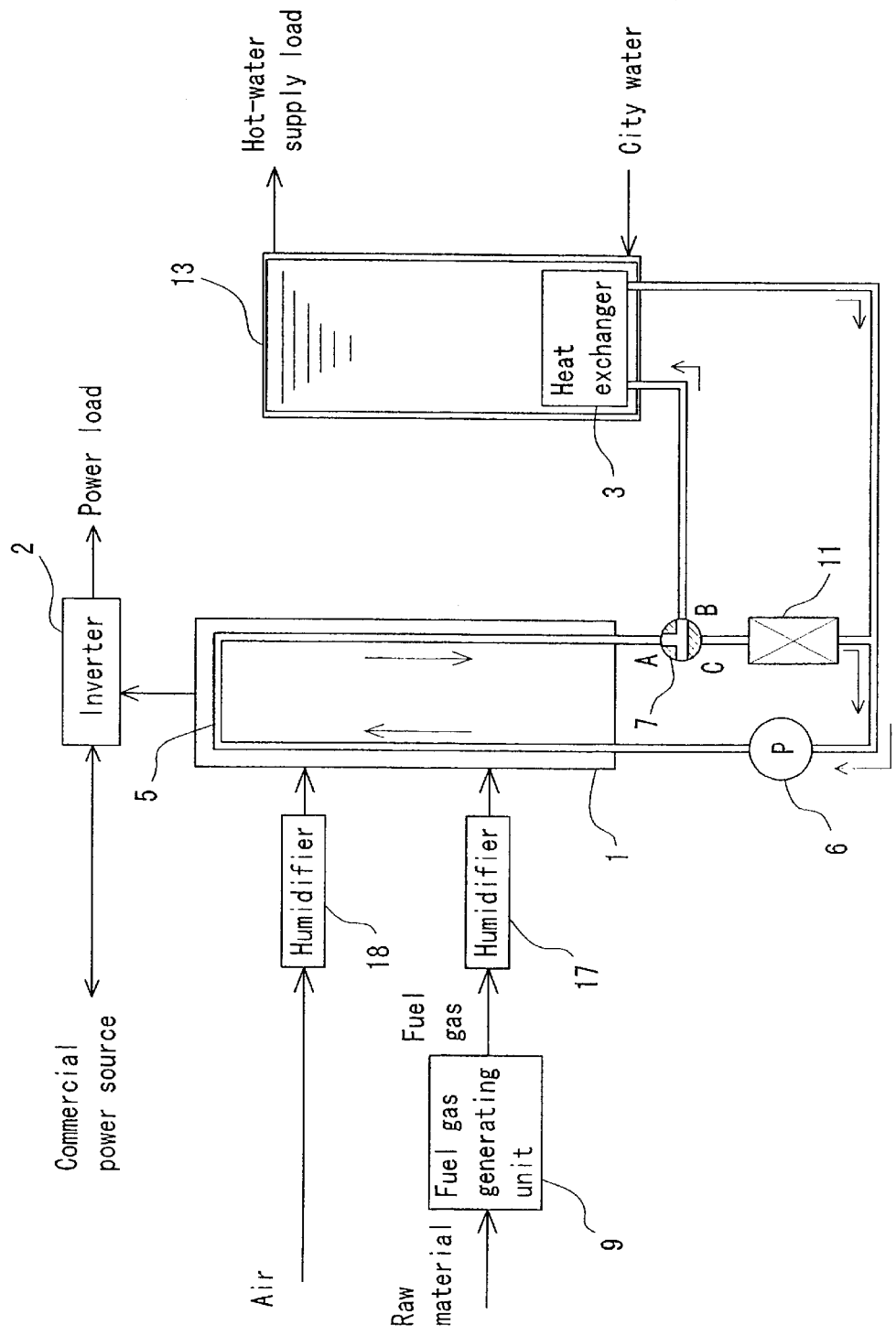
FIG. 4 is a block diagram illustrating a structure of a conventional solid polymer electrolyte fuel cell cogeneration system.

FIG. 3 shows a solid polymer electrolyte fuel cell cogeneration system in accordance with Example 3.

The system comprises a load detector 4 for comparing a magnitude of an external power load connected to the system with an output of an inverter 2. The load detector 4 outputs A detected signal to a controlling unit 8. When the output of the inverter 2 exceeds the magnitude of the power load, the controlling unit 8 controls the load detector 4 to supply excess electric power to a heater 15. The heater 15 is provided downstream from a heat exchanger 10 and supplementarily heats the water heated by the heat exchanger 10. A thermistor 14 detects a temperature of water heated by the heat exchanger 10 and heater 15. The controlling unit 8 controls a water circulating pump 12 so that the temperature of water detected by the thermistor 14 is kept constant.

A thermistor 16 detects a temperature of water in a layer of hot water inside a storage tank 13. When a magnitude of a hot-water supply load exceeds a hot-water supplying ability of the system, the temperature of water detected by the thermistor 16 decreases gradually. The controlling unit 8 issues a command signal to the load detector 4 to supply electric power to the heater 15 when the temperature of water detected by the thermistor 16 is lower than a predetermined value.

The load detector 4 compares an output of the fuel cell with a magnitude of the power load connected to the system and supplies excess electric power of the fuel cell to the heater 15 when the output of the fuel cell is greater than the load. And, the heater 15 makes supplementary heating according to the magnitude of the hot-water supply load.

The solid polymer electrolyte fuel cell cogeneration system in accordance with Example 3 similarly allows use of residual heat remaining in the burner of the fuel gas generating unit or combustion heat of the gas exhausted from the fuel cell for hot-water supply.

According to the present invention, a polymer electrolyte fuel cell cogeneration system can be provided which can supply hot water at high temperature just after operation of the system and can cope with a larger hot-water supply load.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A solid polymer electrolyte fuel cell cogeneration system comprising:
   a solid polymer electrolyte fuel cell for generating electric power and heat by reacting fuel gas with oxidant gas,
   a fuel gas generating unit for generating fuel gas to be supplied to said fuel cell,
   an inverter for supplying electric power to an external power load by converting DC output from said fuel cell to AC,
   a cooling water circulating path for circulating cooling water for recovering heat generated by said fuel cell or fuel gas generating unit,
   a storage tank for reserving hot water to be supplied to an external hot-water supply load,
   a heat exchanger for transferring heat recovered by said cooling water to water in said storage tank,
   a heating path connected to said storage tank, said heating path having said heat exchanger, and
   a pump for passing water in said storage tank through said heat exchanger,
      wherein a water inlet of said heating path and a water filling port for supplying water to said storage tank from the outside of said system are formed both at a lower part of said storage tank, and
      wherein a water outlet of said heating path and a hot-water supply port for supplying hot water in said storage tank to said external hot-water supply load are provided both at an upper part of said storage tank.

2. The solid polymer electrolyte fuel cell cogeneration system in accordance with claim 1, further comprising a heater provided in said heating path and a detector for detecting a magnitude of said external power load.

3. The solid polymer electrolyte fuel cell cogeneration system in accordance with claim 2, further comprising controlling means for supplying excess electric power to said heater, based on such a detection signal that a magnitude of said external power load detected by said detector is smaller than output electric power of said fuel cell.

4. The solid polymer electrolyte fuel cell cogeneration system in accordance with claim 1, further comprising a thermodetector for detecting a temperature of water in said storage tank.

5. The solid polymer electrolyte fuel cell cogeneration system in accordance with claim 4, further comprising controlling means for supplying output electric power of said fuel cell to said heater when a temperature of water detected by said thermodetector decreases lower than a predetermined value.

6. The solid polymer electrolyte fuel cell cogeneration system in accordance with claim 1, further comprising a thermodetector for detecting a temperature of water passing through said heat exchanger and means for controlling said pump in such a way that a temperature of water detected by said thermodetector is kept constant, both being provided down said heat exchanger in said heating path.

7. The solid polymer electrolyte fuel cell cogeneration system in accordance with claim 2, further comprising a thermodetector for detecting a temperature of water passing through said heat exchanger and means for controlling said pump in such a way that a temperature of water detected by said thermodetector is kept constant, both being provided down said heat exchanger in said heating path.

8. The solid polymer electrolyte fuel cell cogeneration system in accordance with claim 4, further comprising a second thermodetector for detecting a temperature of water passing through said heat exchanger and means for controlling said pump in such a way that a temperature of water detected by said second thermodetector is kept constant, both being provided down said heat exchanger in said heating path.

* * * * *